Oct. 10, 1933.    J. CUNNINGHAM    1,930,002
WINDSHIELD ATTACHMENT
Filed Oct. 26, 1932
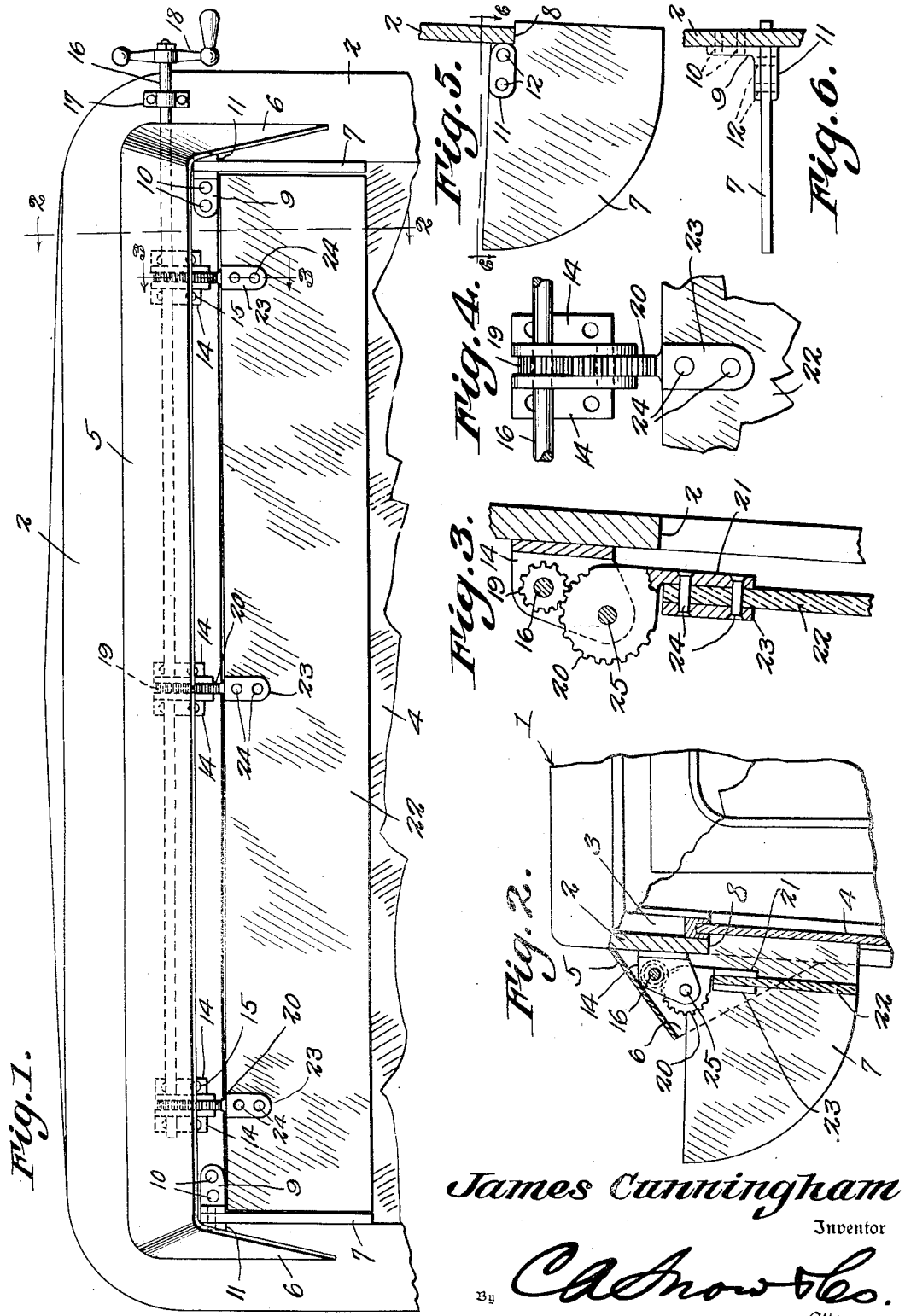
James Cunningham
Inventor Patented Oct. 10, 1933

1,930,002

UNITED STATES PATENT OFFICE 1,930,002

WINDSHIELD ATTACHMENT

James Cunningham, Burlington, N. J.

Application October 26, 1932. Serial No. 639,710

2 Claims. (Cl. 296—95)

The device forming the subject matter of this application is a shield and attendant parts, adapted to be mounted on an automobile, in front of the windshield, and the invention aims to provide a device of the class described which will tend to prevent ice from forming on that part of the windshield through which the driver of the car looks; to provide a device of the class described which will keep the glare of headlights from the driver's eyes, and, also, prevent the glare of sunlight from reaching the driver's eyes.

A further object of the invention is to provide novel means whereby the shield may be adjusted at the will of an operator.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in front elevation, a device constructed in accordance with the invention;

Fig. 2 is a section on the line 2—2 of Fig. 1;

Fig. 3 is a vertical section taken adjacent to one of the bearings;

Fig. 4 is a front elevation of the structure shown in Fig. 3;

Fig. 5 is an elevation disclosing one of the forwardly projecting wings and associated parts;

Fig. 6 is a section on the line 6—6 of Fig. 5.

The device forming the subject matter of this application is adapted to be used in connection with windshield constructions of widely different sorts, but by way of illustration, there is shown in the drawing, an automobile 1, having a windshield frame 2, embodying a guide 3 in which the windshield panel 4 is vertically adjustable, in accordance with a well-known practice. A forwardly and downwardly inclined visor 5 is assembled with the windshield frame 2, and includes depending side portions 6.

In carrying out the invention, forwardly projecting wings 7 are provided, and may be made of glass or any other suitable material. The lower edges of the wings 7 may curve upwardly and forwardly, as shown in Fig. 2. The wings 7 are located just inside of the vertical portions of the windshield frame 2, as shown in Fig. 1, and the wings extend downwardly somewhat further than do the side portions 6 of the visor 5. The rear edges of the wings 7 are in weathertight contact with the windshield panel 4, without, however, preventing a vertical adjustment of the windshield panel, if the windshield panel is of the vertically adjustable variety. Figure 5 shows that, in the upper, rear corners of the wings 7 there are notches 8, adapted to receive the lower edge of the horizontal portion of the windshield frame 2, the forward portions of the wings extending upwardly slightly above the said lower edge of the horizontal part of the windshield frame. For the securing of the wings 7 in place, any appropriate means may be provided. It is suggested that supports 9, in the form of angle brackets, be secured at 10 to the upper, horizontal part of the windshield frame 2, the supports being located in contact with the inner surfaces of the wings 7.

To the outer surfaces of the wings 7, washer plates 11 are applied, securing elements 12 being mounted in the supports or brackets 9, the securing elements passing through the wings 7, into engagement with the washer plates 11.

Bearings 14, which may be angle brackets, are arranged in pairs on the horizontal, upper part of the windshield frame 2, and are secured thereto, as shown at 15. In the bearings 14, underneath the visor 5, is journaled a horizontal operating shaft 16, the operating shaft being journaled, also, in a supplemental bearing 17 mounted on one of the side portions of the windshield frame 2, adjacent to one of the wings 7 of the visor 5, as shown in Fig. 1. The shaft 16 may be rotated, at the will of an operator, by any suitable means, such as a crank 18 secured to that end of the shaft which is adjacent to the bearing 17.

Pinions 19 are secured to the shaft 16, and are located between the bearings 14 of each pair. The pinions 19 mesh with partial gears 20, also located between the bearings 14 of each pair, the partial gears 20 being journaled on shafts 25 carried by the bearings of the pairs.

Each gear 20 has a depending shank 21, extended downwardly behind the upper part of a shield 22, preferably made of glass. The shield 22 may be cooled, tinted, or treated otherwise, so that it will prevent glare. On the front of the shield 22 there are washer plates 23, and securing elements 24 are mounted in the shanks 21 of the gears, the securing elements passing through the upper part of the shield 22, and engaging the washer plates 23. Some other means, however, might be provided for connecting the shield 22 to the gears 20, so that the shield can have an up and down or forward and backward swinging movement. The shield 22 is long enough so that it fits closely but slidably between the wings 7.

In practical operation, through the instrumentality of the crank 18 or its equivalent, rotation is imparted to the shaft 16, the pinions 19 are rotated, and the pinions, meshing with the gears 20, swing the shield 22 up and down, for adjustment. The position of the shield 22 depends on where the direct line of vision of the automobile driver happens to be. The lower edge of the shield 22, however, should be raised approximately one inch above the direct line of vision of the driver. This will enable the driver to look through a clean windshield at all times, regardless of the weather, because a storm, ordinarily cannot drive water, sleet, snow and the like beneath the shield 22, and this is especially true on account of the presence of the forwardly projecting wings 7.

Having thus described the invention, what is claimed is:

1. The combination with a vehicle including a windshield frame having an upper transverse bar, a guide behind the bar, and a panel slidable in the guide; of forwardly projecting wings fixed to the windshield frame and having notches in their upper, rear corners, said notches receiving the lower edge of the bar, and enabling the wings to extend upwardly above the lower edge of the bar, and also backwardly across the lower edge of the bar to make contact with the slidable panel, a shield extended from wing to wing, means for mounting the shield for radial swinging movement, toward and from the panel, and means under the control of an operator for swinging the shield as aforesaid.

2. The combination with a vehicle including a windshield frame having an upper transverse bar, a guide behind the bar, and a panel slidable in the guide; of forwardly projecting wings fixed to the windshield frame and extended backwardly across the lower edge of the bar to make contact with the slidable panel, a shield extended from wing to wing, means for mounting the shield for swinging movement, toward and away from the panel, and means under the control of an operator for swinging the shield as aforesaid.

JAMES CUNNINGHAM.